(12) United States Patent
Devaux et al.

(10) Patent No.: US 12,307,394 B2
(45) Date of Patent: May 20, 2025

(54) DEVICE, SYSTEM AND METHOD FOR DISTRIBUTING AND LOCALLY PERSISTING PROVIDER OBJECTS

(71) Applicant: AMADEUS S.A.S., Biot (FR)

(72) Inventors: Yannick Guiraud Devaux, Mougins (FR); Gilles Louis Claude Gagniard, Roquefort les Pins (FR); Yves Grealou, Antibes (FR); Nicolas Michel Monteil, Villeneuve-Loubet (FR)

(73) Assignee: AMADEUS S.A.S., Biot (FR)

( * ) Notice: Subject to any disclaimer, the term of this patent is extended or adjusted under 35 U.S.C. 154(b) by 55 days.

(21) Appl. No.: 17/973,128

(22) Filed: Oct. 25, 2022

(65) Prior Publication Data

US 2024/0135272 A1 Apr. 25, 2024
US 2024/0232735 A9 Jul. 11, 2024

(51) Int. Cl.
*G06Q 10/02* (2012.01)
(52) U.S. Cl.
CPC .................................. *G06Q 10/025* (2013.01)
(58) Field of Classification Search
CPC .................................................. G06Q 10/025
See application file for complete search history.

(56) References Cited

U.S. PATENT DOCUMENTS

2008/0262878 A1* 10/2008 Webby .................. G06Q 10/02
705/5
2015/0347408 A1* 12/2015 Fontebride ............ G06F 16/951
707/638
2016/0125321 A1* 5/2016 Charret .................. G06Q 10/02
705/5
2016/0307281 A1* 10/2016 Canis ................... G06Q 10/025
(Continued)

FOREIGN PATENT DOCUMENTS

WO WO-2016210344 A1 12/2016

OTHER PUBLICATIONS

Airline retailing an industry vision for offers and orders. (n.d.). https://www.iata.org/contentassets/47c4d32973014560beef3cc421bdf402/airline-retailing-an-industry-vision-for-offers-and-orders.pdf ( 2021) (Year: 2021).*

(Continued)

*Primary Examiner* — Shannon S Campbell
*Assistant Examiner* — Manal A. Alsamiri
(74) *Attorney, Agent, or Firm* — Perry + Currier

(57) ABSTRACT

A device, system and method for distributing and locally persisting provider objects is provided. A first device provides, in a provider object stream, first indications of first provider objects, generated and locally persisted in association with a first region, to a second device associated with a second region. The first device receives, in the stream, from the second device, second indications of second provider objects generated locally persisted in association with the second region, the second indications including respective identifiers identifying the second region. The first device: discards given second provider objects, indicated by the second indications, which do not meet a local persistence condition; and locally persists other second provider objects, as indicated by the second indications, which meet the local persistence condition, the other second provider objects locally persisted in association with the first region.

20 Claims, 6 Drawing Sheets

(56) References Cited

U.S. PATENT DOCUMENTS

| | | | | |
|---|---|---|---|---|
| 2016/0378874 A1* | 12/2016 | Jafri | ............... | G06Q 30/0207 |
| | | | | 707/706 |
| 2017/0308972 A1* | 10/2017 | Atkins | ............... | G06Q 30/0269 |
| 2018/0240207 A1* | 8/2018 | Charrat | ............... | G06F 16/22 |
| 2020/0380425 A1* | 12/2020 | Brun | ............... | G06F 16/248 |
| 2021/0118030 A1 | 4/2021 | Amadieu et al. | | |
| 2021/0174266 A1 | 6/2021 | Akrimi et al. | | |

OTHER PUBLICATIONS

Dadoun, Amine, et al. "How recommender systems can transform airline offer construction and retailing." Journal of Revenue and Pricing Management (2021) 20: 301-315.

IATA, "IATA Standards Implementations Guides—21.3", iata.org, Sep. 30, 2021, Retrieved from the Internet on Feb. 28, 2024 from URL: https://guides.developer.iata.org/docs/21-3_ImplementationGuide.pdf.

* cited by examiner

DEVICE, SYSTEM AND METHOD FOR DISTRIBUTING AND LOCALLY PERSISTING PROVIDER OBJECTS

FIELD

The specification relates generally to intermediation between devices, and specifically to a device, system and method for distributing and locally persisting provider objects.

BACKGROUND

The provision of various products, including for example travel-related goods and services (e.g., flights, hotel reservations, and the like), typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g., according to the eXtensible Markup Language (XML)-based New Distribution Capability (NDC) standard in the context of travel-related products), they may nonetheless employ different mechanisms to initiate the exchange of data. Furthermore, provider objects may be persisted at different devices in different regions, creating challenges in co-ordinating the provider objects.

SUMMARY

A first aspect of the present specification provides a device for providing and receiving provider objects, the device comprising a first device of a plurality of devices that includes at least a second device, the device comprising: a communication interface configured to communicate with the second device; a controller configured to: provide, via the communication interface, first indications of first provider objects, generated in association with a first region, to the second device; the second device associated with a second region; the first indications of the first provider objects provided in a provider object stream between the first device and the second device; the first indications of the first provider objects including respective identifiers that identify the first region; the first provider objects associated with the first region and locally persisted in association with the first region; receive, via the communication interface, from the second device, second indications of second provider objects generated in association with the second region; the second indications of the second provider objects provided in the provider object stream; the second indications of the second provider objects including respective identifiers that identify the second region; the second provider objects associated with the second region and locally persisted in association with the second region; and discard given second provider objects, of the second provider objects as indicated by the second indications, which do not meet a local persistence condition; and locally persist other second provider objects, of the second provider objects as indicated by the second indications, which meet the local persistence condition, the other second provider objects locally persisted in association with the first region.

At the device of the first aspect, the communication interface may be further configured to communicate with additional devices of the plurality of devices, and the provider object stream may be between all of the plurality of devices, and the controller may be further configured to: provide, via the communication interface, the first indications of the first provider objects to all the additional devices of the plurality of devices in the provider object stream; receive, via the communication interface, from one or more of the additional devices, additional indications of additional provider objects generated in association with respective additional regions associated with one or more of the additional devices; the additional indications of the additional provider objects provided in the provider object stream; the additional indications of the additional provider objects including the respective identifiers that identify respective additional regions; the additional provider objects associated with the respective additional regions and locally persisted in association with the respective additional regions; discard given additional provider objects, of the additional provider objects indicated by the additional indications, which do not meet the local persistence condition; and locally persist other additional given provider objects, of the additional provider objects indicated by the additional indications, which meet the local persistence condition, the additional provider objects locally persisted in association with the first region.

At the device of the first aspect, the controller may be further configured to: determine, for a given first provider object, that an updated version of the given first provider object has been locally persisted in association with the first region; and provide, in the provider object stream, an update indication of the updated version of the given first provider object.

At the device of the first aspect, the controller may be further configured to: receive a request to update a given first provider object; generate, for the given first provider object, an updated version of the given first provider object; locally persist the given first provider object in association with the first region; and provide, in the provider object stream, an update indication of the updated version of the given first provider object.

At the device of the first aspect, the controller may be further configured to: receive, from a third device associated with a third region, a request to update a given second provider object associated with the second region; and send the request to the second device such that the second device generates an updated version of the given second provider object.

At the device of the first aspect, the controller may be further configured to: receive, from the second device, a request for a given first provider object; and provide, to the second device, the given first provider object to the second device.

At the device of the first aspect, the local persistence condition may comprise rules for discarding or locally persisting the provider objects as indicated in the provider object stream.

At the device of the first aspect, the local persistence condition may comprise rules for discarding or locally persisting the provider objects received in the provider object stream, and the rules may comprise criteria for identifying the provider objects that have been accessed or updated after an initial generation, and the provider objects that have been identified as having been accessed or updated after an initial generation may be locally persisted.

At the device of the first aspect, the first provider objects may be associated via a first common identifier, and the second provider objects may be associated via a second common identifier.

At the device of the first aspect, the first indications and the second indications may include mapping keys associated with aliases of identifiers of respective provider object regions.

A second aspect of the present specification provides a method for providing and receiving provider objects at a first device of a plurality of devices that includes at least a second device, the method comprising: providing, from the first device, first indications of first provider objects, generated in association with a first region, to the second device; the second device associated with a second region; the first indications of the first provider objects provided in a provider object stream between the first device and the second device; the first indications of the first provider objects including respective identifiers that identify the first region; the first provider objects associated with the first region and locally persisted in association with the first region; receiving, at the first device, from the second device, second indications of second provider objects generated in association with the second region; the second indications of the second provider objects provided in the provider object stream; the second indications of the second provider objects including respective identifiers that identify the second region; the second provider objects associated with the second region and locally persisted in association with the second region; discarding, via the first device, given second provider objects, of the second provider objects as indicated by the second indications, which do not meet a local persistence condition; and locally persisting, via the first device, other second provider objects, of the second provider objects as indicated by the second indications, which meet the local persistence condition, the other second provider objects locally persisted in association with the first region.

At the method of the second aspect, the first device may be further configured to communicate with additional devices of the plurality of devices, the provider object stream may be between all of the plurality of devices, and the method may further comprise: providing, from the first device, the first indications of the first provider objects to all the additional devices of the plurality of devices in the provider object stream; receiving, at the first device, from one or more of the additional devices, additional indications of additional provider objects generated in association with respective additional regions associated with one or more of the additional devices; the additional indications of the additional provider objects provided in the provider object stream; the additional indications of the additional provider objects including the respective identifiers that identify respective additional regions; the additional provider objects associated with the respective additional regions and locally persisted in association with the respective additional regions; discarding given additional provider objects, of the additional provider objects indicated by the additional indications, which do not meet the local persistence condition; and locally persisting other additional given provider objects, of the additional provider objects indicated by the additional indications, which meet the local persistence condition, the additional provider objects locally persisted in association with the first region.

The method of the second aspect may further comprise: determining, for a given first provider object, that an updated version of the given first provider object has been locally persisted in association with the first region; and providing, in the provider object stream, an update indication of the updated version of the given first provider object.

The method of the second aspect may further comprise: receiving a request to update a given first provider object; generating, for the given first provider object, an updated version of the given first provider object; locally persisting the given first provider object in association with the first region; and providing, in the provider object stream, an update indication of the updated version of the given first provider object.

The method of the second aspect may further comprise: receiving, at the first device, from a third device associated with a third region, a request to update a given second provider object associated with the second region; and sending, from the first device, the request to the second device such that the second device generates an updated version of the given second provider object.

The method of the second aspect may further comprise: receiving, from the second device, a request for a given first provider object; and providing, to the second device, the given first provider object to the second device.

At the method of the second aspect, the local persistence condition may comprise rules for discarding or locally persisting the provider objects as indicated in the provider object stream.

At the method of the second aspect, the local persistence condition may comprise rules for discarding or locally persisting the provider objects received in the provider object stream, the rules may comprise criteria for identifying the provider objects that have been accessed or updated after an initial generation, and the provider objects that have been identified as having been accessed or updated after an initial generation may be locally persisted.

At the method of the second aspect, the first provider objects may be associated via a first common identifier, and the second provider objects may be associated via a second common identifier.

At the method of the second aspect, the first indications and the second indications may include mapping keys associated with aliases of identifiers of respective provider object regions.

A third aspect of the present specification provides a non-transitory computer-readable medium storing a computer program, wherein execution of the computer program is to implement a method for providing and receiving provider objects at a first device of a plurality of devices that includes at least a second device, the method comprising: providing, from the first device, first indications of first provider objects, generated in association with a first region, to the second device; the second device associated with a second region; the first indications of the first provider objects provided in a provider object stream between the first device and the second device; the first indications of the first provider objects including respective identifiers that identify the first region; the first provider objects associated with the first region and locally persisted in association with the first region; receiving, at the first device, from the second device, second indications of second provider objects generated in association with the second region; the second indications of the second provider objects provided in the provider object stream; the second indications of the second provider objects including respective identifiers that identify the second region; the second provider objects associated with the second region and locally persisted in association with the second region; discarding, via the first device, given second provider objects, of the second provider objects as indicated by the second indications, which do not meet a local persistence condition; and locally persisting, via the first device, other second provider objects, of the second provider objects as indicated by the second indications, which meet the local persistence condition, the other second provider objects locally persisted in association with the first region.

At the method of the third aspect, the first device may be further configured to communicate with additional devices of the plurality of devices, the provider object stream may be between all of the plurality of devices, and the method may further comprise: providing, from the first device, the first indications of the first provider objects to all the additional devices of the plurality of devices in the provider object stream; receiving, at the first device, from one or more of the additional devices, additional indications of additional provider objects generated in association with respective additional regions associated with one or more of the additional devices; the additional indications of the additional provider objects provided in the provider object stream; the additional indications of the additional provider objects including the respective identifiers that identify respective additional regions; the additional provider objects associated with the respective additional regions and locally persisted in association with the respective additional regions; discarding given additional provider objects, of the additional provider objects indicated by the additional indications, which do not meet the local persistence condition; and locally persisting other additional given provider objects, of the additional provider objects indicated by the additional indications, which meet the local persistence condition, the additional provider objects locally persisted in association with the first region.

The method of the third aspect may further comprise: determining, for a given first provider object, that an updated version of the given first provider object has been locally persisted in association with the first region; and providing, in the provider object stream, an update indication of the updated version of the given first provider object.

The method of the third aspect may further comprise: receiving a request to update a given first provider object; generating, for the given first provider object, an updated version of the given first provider object; locally persisting the given first provider object in association with the first region; and providing, in the provider object stream, an update indication of the updated version of the given first provider object.

The method of the third aspect may further comprise: receiving, at the first device, from a third device associated with a third region, a request to update a given second provider object associated with the second region; and sending, from the first device, the request to the second device such that the second device generates an updated version of the given second provider object.

The method of the third aspect may further comprise: receiving, from the second device, a request for a given first provider object; and providing, to the second device, the given first provider object to the second device.

At the method of the third aspect, the local persistence condition may comprise rules for discarding or locally persisting the provider objects as indicated in the provider object stream.

At the method of the third aspect, the local persistence condition may comprise rules for discarding or locally persisting the provider objects received in the provider object stream, the rules may comprise criteria for identifying the provider objects that have been accessed or updated after an initial generation, and the provider objects that have been identified as having been accessed or updated after an initial generation may be locally persisted.

At the method of the third aspect, the first provider objects may be associated via a first common identifier, and the second provider objects may be associated via a second common identifier.

At the method of the third aspect, the first indications and the second indications may include mapping keys associated with aliases of identifiers of respective provider object regions.

BRIEF DESCRIPTIONS OF THE DRAWINGS

For a better understanding of the various examples described herein and to show more clearly how they may be carried into effect, reference will now be made, by way of example only, to the accompanying drawings, in which.

DETAILED DESCRIPTION

Figure 1:
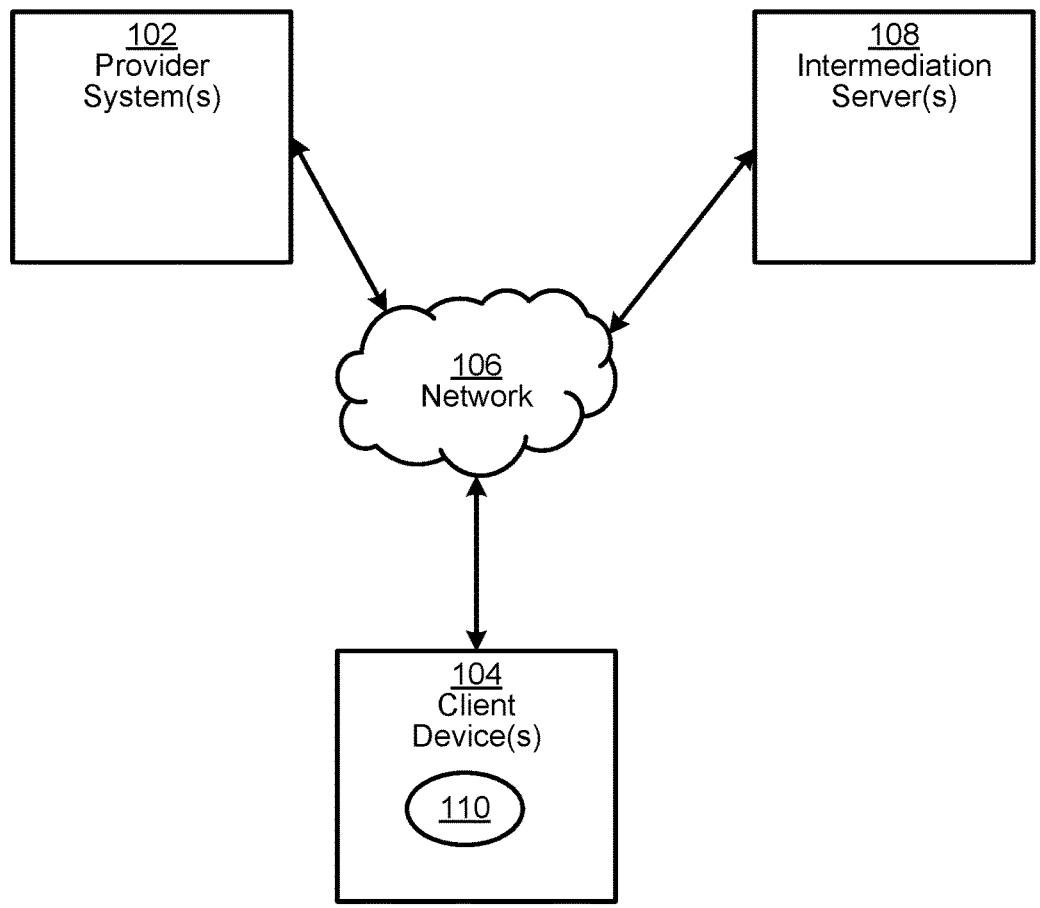
FIG. 1 depicts a system for intermediation between a provider system, and a client device, according to non-limiting examples.

FIG. 1 depicts a system 100 for intermediation between a provider system (e.g., one or more servers or other suitable computing devices), and a client device. Provider objects, in the examples discussed herein, may comprise provider objects and/or data records, which correspond to products and/or items, such as travel-related goods and services (e.g., flights, hotel reservations, car rentals and the like), provided by a provider system. More specifically, the products and/or items discussed in the examples below may be flight tickets and related services (e.g., limo pickup services, excursions at a destination, baggage check services, in-flight food, entertainment, pet-related services, and the like). However, as will be apparent to those skilled in the art, the systems and methods discussed below can also be applied to various other types of data objects and/or items including, but not limited to, data objects correspond to any suitable products and/or any suitable items available (e.g., for purchase, and the like) from any suitable website, and the like.

Delivery of the items mentioned above is typically controlled by a provider entity, such as an airline in the case of the items discussed in connection with the travel-industry related examples provided herein. The system 100 includes one or more provider systems 102 (e.g., one or more servers or other suitable computing devices), which in this example is operated by one or more provider entities. The system 100 may include a plurality of client devices 104, although only one client device 104 is shown in FIG. 1 for illustrative purposes. The system 100 may include a plurality of intermediation servers 108, although only one intermediation server 108 is shown in FIG. 1 for illustrative purposes The system 100 may include a plurality of provider systems 102, each operated by respective provider entities (e.g., various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g., by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g., data fields), and the like. Certain fields define item attributes, such as product object identifiers (e.g., service identifiers, item identifiers, product identifiers and the like), locations, dates and times corresponding to the products (e.g., flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g., any suitable combination of local and wide area networks, including the Internet) and via an intermediation server 108. As will be described below, the intermediation server 108 generally intermediates between the client device 104 and the provider system 102, for example such that the client device 104 may request products from the provider system 102 (and/or more than one provider system 102) via the intermediation server 108.

Furthermore, in some examples, the intermediation server 108 may convert data between formats associated with provider systems 102 and the client device 104. For example, a first provider system 102 may communicate and/or provide provider objects, and/or offers for provider objects, according to a first format, and a second provider system 102 may communicate and/or provide provider objects, and/or offers for provider objects, according to a second format (e.g., which may be the same or different from the first format). Neither format may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g., representing products, which may be for purchase), and/or requests to purchase products (e.g., represented by the provider objects), to the provider system 102, via the intermediation server 108, on behalf of end users (e.g., travelers). However it is understood that the client device 104 may request that any suitable actions, and the like, associated the provider objects, occur, for example via the intermediation server 108.

Hence, in one example, the intermediation server 108 may comprise an aggregator server, which communicates with a plurality of provider systems 102 and aggregates provider objects and/or offers for provider objects from the plurality of provider systems 102, to provide to the client device 104. When formats of data used by the provider systems 102 and the client device 104 are compatible, the intermediation server 108 may not perform the conversions described herein when performing the aggregation functionality.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g., such as via the network 106), herein communication between components of the system 100 is referred to as the components providing data, and the like, therebetween, which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard. However, the terms "offer" and "order" as used herein may be more generic; for example, an offer for a provider object may refer to any suitable indication of provider object that may be available, for example for purchase, while an order for a provider object may refer to any suitable request to book and/or purchase a provider object that was previously indicated as being available. In NDC-based data exchanges, it is understood that respective provider objects may be identified by, and/or may comprise, identifiers referred to as OfferIds and/or an OfferID.

The client device 104 is configured to receive data contained in the provider objects via the intermediation server 108. Data obtained by the client device 104, via the intermediation server 108, may be presented to users served by the client device 104, for example via a display screen (not depicted), which may be local to the client device 104; further information associated with the items represented by the provider objects may be requested by the client device 104, which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108, one or more of which then update previously provided provider objects to include the further information, and the like.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data may generally comprise information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102, which specifically identifies the NDC offer (e.g., the aforementioned OfferID). However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 may occur via a computing-process flow 110 implemented by the client device 104, such as an Applications Programming Interface (API), and the like. For example, during offering and ordering of a provider object (e.g., booking a flight), the client device 104 may implement the computing-process flow 110 in the form of an API, and communications between the client device 104 and the intermediation server 108 may be defined by the API.

Regardless, the steps of offering and ordering a provider object may occur according to a predefined series of steps, but which may include a requesting step and/or shopping step, a selecting step, a booking step and a paying step. It is understood, however, that such steps are not meant to be exhaustive, and other steps may occur in in the computing-process flow 110. However, in any of these steps, a provider object may be updated to include further items for selection that may be added to the provider object, and an operator of the client device 104 may select from the items for selection to update the provider object.

Using a travel-based example, at the requesting step and/or shopping step, one or more provider objects may be generated that includes a flight and various other items for selection, such as a seat selection service, a limo service, and the like; the one or more provider objects may be generated in response to a provider object request from the client device 104 that includes criteria for searching (e.g., a date, a departure airport, an arrival airport, amongst other possibilities), and the one or more provider objects are understood to meet at least a portion of such criteria. The provider object(s) may be presented to an operator of the client device 104, for example via a display screen, and the operator of the client device 104 may select, at the selecting step, one of the provider objects that includes a respective flight, and optionally select one or more of the other items for selection causing the selected provider object to be updated. The provider object with the selected item(s) may again be presented to the operator of the client device 104 at a second selecting step, and the provider object may be further updated to include more items for selection, such as the previously presented other items for selection and/or different items for selection, such as a lounge pass. The selecting step may be repeated until the operator of the client device 104 initiates the booking step; at the booking step, the provider object may again be updated to include any previously selected items and yet further items for selection. Once a finalized set of items for the provider object is selected, the operator of the client device 104 may initiate the paying step to pay for a final updated provider object that includes the items selected at the previous steps.

Hence, it is understood that a provider object may be updated at any suitable step of the aforementioned steps, which may include altering an existing provider object and/or replacing a previous provider object with a next provider object associated with the previous provider object. In general, updating a provider object as described herein may comprise any suitable mechanisms. Furthermore, any suitable combination of provider systems 102 and intermediation servers 108 may manage and/or update, though a given provider system 102 generally manages their own provider objects, while an intermediation server 108 may manage provider objects from a plurality of provider systems 102.

In general, functionality of provider systems 102 and/or intermediation servers 108 of the system 100 that manage and/or update provider objects may be distributed among geographic regions, and different components of the provider systems 102 and/or intermediation servers 108 may have different functionality. For example, a component of a provider system 102 and/or intermediation servers 108 in one region may be configured to receive, generate and/or update provider objects, while a component of a provider system 102 and/or intermediation servers 108 in another region may be configured to retrieve provider objects from other computing devices and/or update provider objects (e.g., but not generate provider objects).

However, when a provider object is generated by a component of a provider system 102 and/or intermediation servers 108, and the like, in a first region, that provider object is generally associated with the first region (e.g., by way of an identifier associated with the provider object), but other components of a provider system 102 and/or intermediation servers 108, associated with other regions, may retrieve the provider object, for example to provide the provider object to a client device 104 in their respective region, and/or to update the provider object, which causes a significant technical problem in coordinating provider objects amongst the components of the provider system 102 and/or the intermediation servers 108.

For example, for a first component in a first region to retrieve a provider object from a second component in a second region, the first component should be aware of the provider object, as well as updates thereto. This situation may require a complex series of data exchanges between components in different regions that wastes bandwidth to make the components aware of available provider objects. Such a situation may be particularly inefficient as often only a small number of provider objects may be relevant within the system 100 (e.g., 1% of the total number of the provider objects may eventually be purchased at the paying step of the computing-process flow 110), and hence inquiries and/or data exchanges between the components regarding all provider objects may generally both waste bandwidth and processing resources at the components.

Furthermore, when a provider object associated with a first region is "consumed" in a second region (e.g., provided and/or updated via an implementation of the computing-process flow 110 in the second region), a clone of the provider object may be generated in the second region, such a clone comprising a new provider object having a different identifier from the parent provider object, that may still be maintained in the first region, but such cloning also has issues as then two different versions of the provider object exist and coordinating such provider objects may be challenging and/or complex to manage.

To address this problem, the system 100 may be modified to include computing devices in different regions, which distribute indications of provider objects, that are locally persisted in the different regions, to other computing devices in other regions. A computing device associated with a first region may generally interact with components of the provider system 102 and/or the intermediation server 108, associated with the first region regions, that manage and/or generate provider objects, to identify such provider objects.

Furthermore, the computing devices provided herein are configured to communicate via a provider object stream. The computing devices use the provider object stream to provide indications of provider objects, that are generated and/or updated in their respective regions, and such indications are streamed, on the provider object stream, to the various computing devices in all the regions. The computing devices, which receive the indications makes decisions about which provider objects to keep and/or store and/or replicate locally, for example according to a local persistence condition, described in more detail below though, in general, (e.g., only) "high value" provider objects (and/or replicas thereof) may be locally persisted and/or stored. Once replicated locally, such a provider object may then be accessed locally, for example to provide to a client device. Such a replica may be the same as a parent provider object in another region, and include an identifier of the region with which the parent is associated, as well as share the same respective provider object identifier (e.g., the same OfferID).

However, this situation leads its own technical challenges as when a parent or replicated provider object is updated at one computing device, differences in a replicated and parent provider object may occur at different computing devices in different regions. The problem may again be addressed via the provider object stream, in which indications of updated provider objects are also provided in the provider object stream.

Hence, hereafter aspects of the present specification are described as being implemented at computing devices, which may include any suitable combination of computing devices of the provider system 102, the intermediation server 108 and/or any other suitable computing devices.

While present examples may be implemented in any suitable manner, it is further understood that, in some examples, the intermediation server 108 and/or one or more of the provider systems 102 may operate according to an NDC standard.

Figure 2:
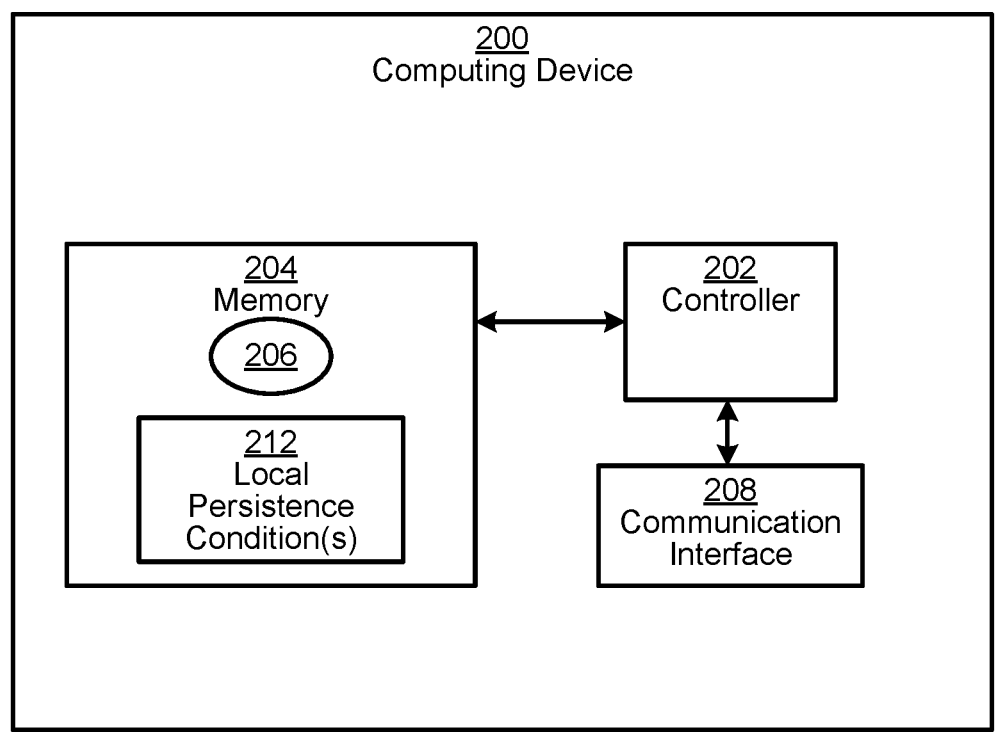
FIG. 2 depicts a computing device for distributing and locally persisting provider objects, according to non-limiting examples.

Turning to FIG. 2, before discussing the functionality of the system 100 in greater detail, certain components of a computing device 200 will be discussed in greater detail. While depicted as one device, the computing device 200 may comprise one or more computing devices and/or one or more cloud computing devices that may be geographically distributed, though a given computing device and/or combination of given computing devices, may be associated with a given region (e.g., a given geographical region) as described in more detail with respect to FIG. 3. For example, the computing device 200 may comprise any suitable combination of computing devices of the provider system 102, the intermediation server 108 (and alternatively the client device 104, for example when combined with one or more of the provider system 102 and the intermediation server 108).

As shown in FIG. 2, the computing device 200 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the computing device 200 to communicate with the other computing devices of the system 100 via the network 106, though it is understood such communication may occur locally when components of the system 100 are combined. The communication interface 208 therefore may include any necessary components (e.g., network interface controllers (NICs), radio units, and the like) to communicate via the network 106. The specific components of the communication interface 208 may be selected based on the nature of the network 106 and/or local communication between components of the system 100, and the like. The computing device 200 can also include input and output devices connected to the controller 202, such as keyboards, mice, displays, and the like (not shown).

The components of the computing device 200 mentioned above can be deployed in a single enclosure, or in a distributed format. In some examples, therefore, the computing device 200 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the computing device 200; regardless, the controller 202 is understood to have access to the memory 204.

The memory 204 also stores a plurality of computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein. In the description below, the controller 202, and more generally the computing device 200, are said to be configured to perform those actions. It will be understood that they are so configured via the execution (by the controller 202) of the instructions of the applications stored in memory 204.

In some examples, execution of the application 206, as will be discussed below, configures the computing device 200 to implement functionality for distributing and locally persisting provider objects, including but not limited to, the blocks of a method set forth in FIG. 4.

As will be described in more detail below, in some examples, the application 206 may comprise one or more machine learning algorithms trained to implement functionality for distributing and locally persisting provider objects, including but not limited to, the blocks of a method set forth in FIG. 4. However, alternatively, or in addition, the application 206 may comprise one or more programmatic algorithms.

As depicted, the memory 204 further stores one or more local persistence conditions 212, which comprise criteria for locally persisting (e.g., storing locally), or discarding provider objects received from other computing devices, as described herein. The one or more local persistence conditions 212 may be implemented via one or more machine learning algorithms and/or one or more programmatic algorithms. Furthermore, while the one or more local persistence conditions 212 are depicted as being separate from the application 206, the one or more local persistence conditions 212 may comprise components and/or modules of the application 206.

Figure 3:
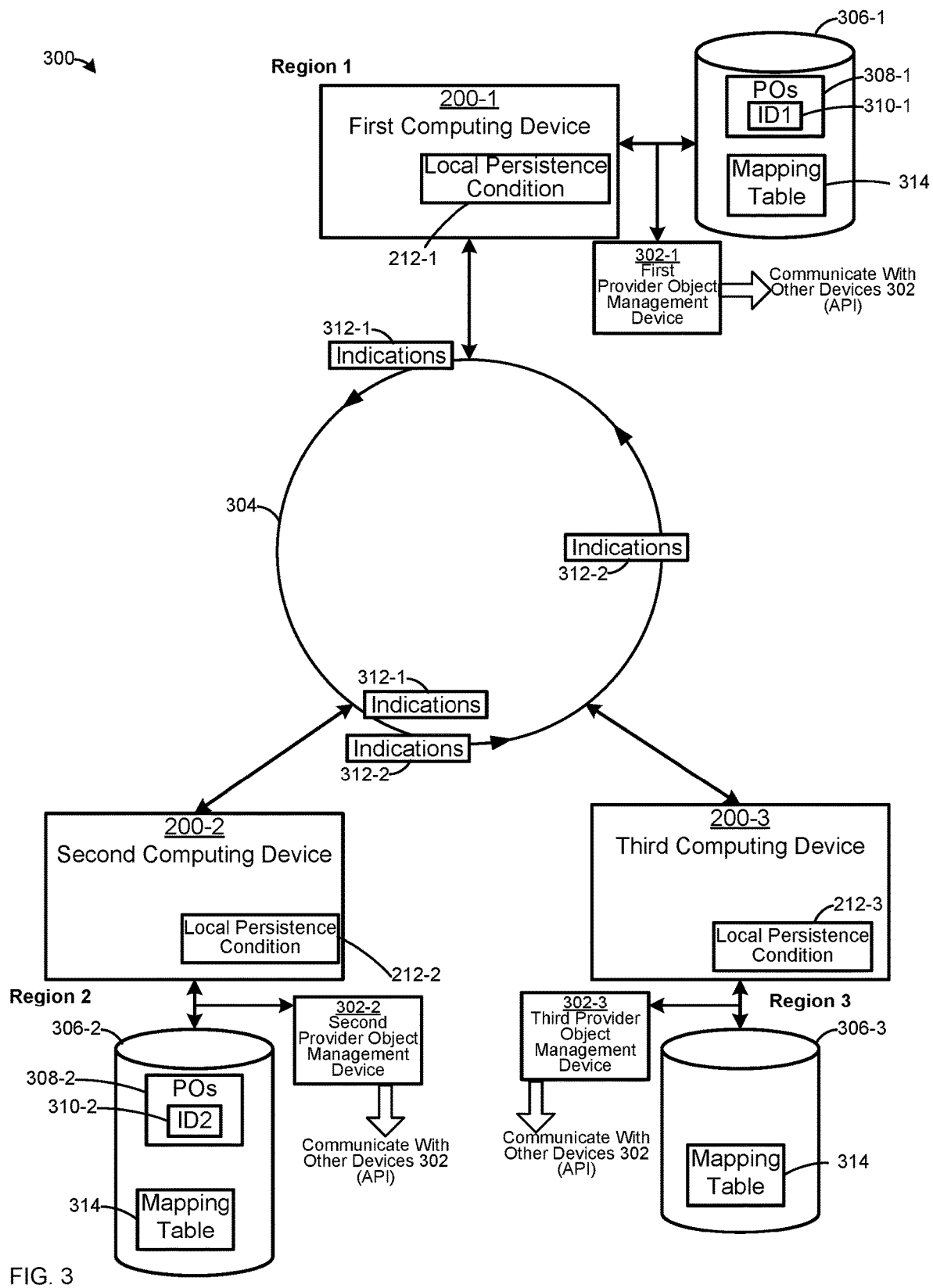
FIG. 3 depicts a system for distributing and locally persisting provider objects, according to non-limiting examples, according to non-limiting examples.

Attention is now directed to FIG. 3, which illustrates one example of a system 300 that includes three computing devices 200-1, 200-2, 200-3, in communication via a provider object stream 304. The computing devices 200-1, 200-2, 200-3 are interchangeably referred to hereafter, collectively, as the computing devices 200 and, generically as a computing device 200; this convention will be used throughout the present specification.

A respective computing device 200 may comprise an instance of the computing device 200 as depicted in FIG. 2. Furthermore, the system 300 may comprise a particular implementation of the system 100 and while the network 106 is not depicted, it is nonetheless understood to be present and communication between the computing devices 200, and other components of the system 300 may occur via the network 106. For example, communication links between components of the system 300 are depicted in FIG. 4, and throughout the present specification, as double-ended arrows between respective components; the communication links may include any suitable combination of wireless and/or wired links and/or wireless and/or wired communication networks including, but not limited to, the network 106.

As depicted, a respective computing device 200-1, 200-2, 200-3 is in communication with a respective provider object management device 302-1, 302-2, 302-3 (e.g., the provider object management devices 302 and/or a provider object management device 302). For example, a first computing device 200-1 is in communication with a first provider object management device 302-1, a second computing device 200-2 is in communication with a second provider object management device 302-2, and a third computing device 200-3 is in communication with a third provider object management device 302-3.

The provider object management devices 302 may comprise components of provider systems 102 and/or intermediation servers 108 that generate and/or manage and/or update provider objects according to interactions with client devices 104 during implementations of the computing-process flow 110. While client devices 104 are not depicted, they may nonetheless be present in the system 300 and in communication with the provider object management devices 302.

While three computing devices 200, etc., are depicted for illustrative purposes, the system 300 may comprise as few as two computing devices 200 (and associated provider object management device 302), or more than three computing device 200 (provider object management device 302).

Furthermore, as depicted, a computing device 200 and a corresponding provider object management device 302 is understood to be associated with a respective region. For example, the first computing device 200-1 and the first provider object management device 302-1 are associated with a first region ("Region 1"), the second computing device 200-2 and the second provider object management device 302-2 are associated with a second region ("Region 2"), and the third computing device 200-3 and the third provider object management device 302-3 are associated with a third region ("Region 3"). The regions may comprise different geographical regions, such as different states, different counties, different countries and the like. For example, the first provider object management device 302-1 may be configured to communicate with client devices 104 located in the first region, the second provider object management device 302-2 may be configured to communicate with client devices 104 located in the second region, and the third provider object management device 302-3 may be configured to communicate with client devices 104 located in the third region.

However, the provider object management devices 302 may have different functionality. For example, a provider object management device 302 in one region may be configured to generate and update provider objects, for example when responding to requests from client devices 104 and/or other provider object management devices 302. However, a provider object management device 302 in another region may be configured to retrieve provider objects from other provider object management device 302 and/or update provider objects (e.g., but not generate provider objects), for example when responding to requests from client devices 104; hence, these provider object management devices 302 may rely on other provider object management devices 302 to generate provider objects.

Hereafter, an example will be described, in which the provider object management devices 302-1, 302-2 are configured to both generate and update provider objects, while the provider object management device 302-3 is configured to update provider objects, but not generate provider objects.

As depicted, a respective computing device 200-1, 200-2, 200-3, as well as a corresponding provider object management device 302-1, 302-2, 302-3, is in communication with a respective memory 306-1, 306-2, 306-3 (e.g., (e.g., a first memory 306-1, a second memory 306-2, a third memory 306-3, interchangeably referred to as the memories 306 and/or a memory 306) provided in the form of respective databases. A respective memory 306 stores respective sets of associated provider objects 308-1, 308-2 (e.g., the provider objects 308 and/or a provider object 308), which may be associated via respective identifiers 310-1, 310-2 (e.g., the identifiers 310 and/or an identifier 310) that respectively identify a region, with which a respective provider object 308 is associated.

For example, the identifier 310-1 is understood to identify the first region, and the identifier 310-1 may be incorporated into, and/or associated with, the provider objects 308-1 associated with the first region. Similarly, the identifier 310-2 is understood to identify the second region, and the identifier 310-2 may be incorporated into, and/or associated with, the provider objects 308-2 associated with the second region. The identifiers 310 may comprise any suitable alphanumeric identifier, and the like, which identifies a respective region.

As depicted, no provider objects 308 are associated with the third region as the provider object management device 302-3 is configured to update provider objects, but not generate provider objects. Put another way, in the depicted example, provider objects 308 may only be associated with a region where the provider objects 308 are generated.

The provider object stream 304 may comprise any suitable combination of communication links between the computing devices 200. In general, the computing devices 200 stream, to the other computing devices 200, indications of provider objects 308 that are generated and/or updated via respective provider object management devices 302. Put another way, the provider object stream 304 may provide any suitable combination of communication links between the computing devices 200, over which indications of provider objects are provided from the computing devices 200 are proactively streamed to other computing devices 200, for example without the computing devices 200 requesting the indications.

The indications streamed in the provider object stream 304 may comprise a log and/or a versioned log of provider objects 308 that are generated and/or updated in a given region. Hence, for example, a computing device 200 may access a respective memory 306 to determine changes to the provider objects 308 that may have occurred, generate indications thereof, and provide such indications in the provider object stream 304.

In particular, it is understood that such indications are streamed, from one computing device 200 to the other computing devices 200, in the provider object stream 304, without the indications being requested by the other computing devices 200, which generally reduces bandwidth usage in the system 300 as compared to if the indications were being requested. Indeed, such streaming further reduce processing resource usage at the computing devices 200 as generation and management of such requests, and management of responses to such requests, is obviated at the computing devices 200 via such streaming; for example, when requests are used, a computing device generally manages overhead for such requests, such as tracking timeouts, resending requests, and the like, and, in the present examples, at least such overhead is obviated.

As depicted, the first computing device 200-1 has generated first indications 312-1 of the provider objects 308-1 that have been generated (and/or updated) at the first region, and similarly the second computing device 200-2 has generated second indications 312-2 of the provider objects 308-2 that have been generated (and/or updated) at the second region. The indications 312-1, 312-2 may be referred to hereafter as the indications 312 and/or an indication 312.

As depicted, the first indications 312-1 are streamed in the provider object stream 304 to the second computing device 200-2 and the third computing device 200-3. Similarly, the second indications 312-2 are streamed in the provider object stream 304 to the first computing device 200-1 and the third computing device 200-3.

In general, an indication 312 of a provider object 308 comprise the identifier 310 identifying the region, with which the provider object 308 is associated, as well as an identifier specific to the provider object (e.g., e.g., the aforementioned Offends). Such an indication 312 further generally includes suitable information to enable a receiving computing device 200 to generate a replica of the provider object 308 identified in the indication 312, and such a replica is stored at a respective memory 306. Such a replica includes the identifier 310 identifying the region, with which the provider object 308 is associated as well as the identifier specific to the provider object 308. Furthermore, an indication 312 may indicate whether the provider object 308 is newly generated or updated, and/or at which step of the computing-process flow 110 the provider object 308 was generated or updated.

However, whether or not a computing device 200 that receives an indication 312 discards the indication 312 (e.g., and/or a provider object 308 indicated by the indication 312) or locally persists a provider object 308 indicated by the indication 312 (e.g., in the form of a replica of the provider object 308 stored at a local memory 306) is determined via a local persistence condition 212. For example, the first computing device 200-1 implements a first local persistence condition 212-1, the second computing device 200-2 implements a second local persistence condition 212-2, and the third computing device 200-3 implements a third local persistence condition 212-3. The local persistence conditions 212 are described in more detail below.

The indications 312 may be generated and provided in the provider object stream 304 as respective provider objects 308 are generated and/or updated at a respective memory 306, and/or the indications 312 may be generated and provided in the provider object stream 304 periodically, and/or in any suitable manner. Hence, the indications 312 may be provided as versioned logs of respective provider objects 308, such that a set of indications 312 indicate a version of a log of the provider objects 308 at a respective memory 306. In some examples, the indications 312 may indicate only respective provider objects 308 that have been generated and/or updated at a respective memory 306 since a last log and/or set of indications 312 was provided; while, in other examples, the indications 312 may indicate all respective provider objects 308 at a respective memory 306.

It is further understood that, as depicted, the provider object management devices 302 are also configured to communicate with each other (e.g., outside of the provider object stream 304), for example via Application Programming Interfaces (APIs). While for simplicity the communication links therebetween are not explicitly depicted, it is understood that they are nonetheless present and are further understood to be implemented via the network 106.

Furthermore, while the devices 200, 302 in a given region are depicted as being separate from each other, in other examples, such functionality of such devices 200, 30 may be combined. For example, functionality of the first computing device 200-1 may be combined with functionality of the first provider object management device 302-1, etc.

As depicted, the memories 306 may further store a mapping table 314, which may be provisioned at the memories 306 by an entity associated with the system 300 (e.g., a provider entity, and the like, and/or any other suitable entity). The mapping table 314 may comprise keys, such as mapping keys associated with regions and/or identifiers 310 of regions. In a particular example, the mapping table 314 may comprise:

TABLE I

| Mapping Keys | Associated Region Identifier |
| --- | --- |
| Mapping_Key1 | 310-1 |
| Mapping_Key2 | 310-1 |
| Mapping_Key3 | 310-2 |
| Mapping_Key4 | 310-2 |
| Mapping_Key5 | 310-2 |
| Mapping_Key6 | 310-3 |

For the example, as depicted in the mapping table 314 of Table I, the mapping table 314 comprises mapping keys: Mapping_Key1, Mapping_Key2, Mapping_Key3, Mapping_Key4, Mapping_Key5, Mapping_Key6. Mapping_Key1, Mapping_Key2 are associated with the first region (e.g., identified by the identifier 310-1); Mapping_Key3, Mapping_Key4, Mapping_Key5 are associated with the second region (e.g., identified by the identifier 310-2); and Mapping_Key6 is associated with the third region (e.g., identified by the identifier 310-3). Such an example illustrates that one or more mapping keys may be used to identify a region by virtue of their association with a respective region, and may be used in place of the identifiers 310 in the indications 312.

For example, a mapping key may be incorporated into an indication 312 of a provider object (e.g., for an entry in a log of an indication 312 representing a provider object), for example to indicate that a provider object indicated by the indication 312 is associated with a region associated with the mapping key. In some examples, a format of an entry of a log of an indication 312 may comprise:

$$\text{Indication}(PO) = \text{Identifier}(PO) + \text{Mapping Key} + \text{Lifecycle}(PO) \qquad \text{Equation (1)}$$

In Equation (1): "Indication(PO)" comprises an entry in a log of an indication 312 for a particular provider object (e.g., "PO"); "Identifier (PO)" comprises an identifier of the provider object indicated by the "Indication (PO)" and/or that is associated with the "Indication (PO)"; "Mapping Key" comprises an associated mapping key, for example selected from Table I (e.g., and which may be associated with a region where the provider object originated and/or is initially associated); and "Lifecycle (PO)" comprises a time at which the associated provider object expires (e.g., a time for which tickets sales close for an associated flight, and the like, amongst other possibilities). While not depicted, the "Indication(PO)" may further indicate whether the associated provider object has been newly generated, or is being updated, and/or the "Indication(PO)" may further indicate may indicate a step of the computing-process flow 110, at which the associated provider object is being updated.

However, it is understood that a region associated with one or more of the mapping keys may change, for example when an associated computing device 200 and/or an associated provider object management device 302 goes offline and/or becomes unavailable (e.g., for maintenance, connectivity issues and/or for any other suitable reason). Hereafter, reference will be made to a region becoming unavailable, which may be understood to include, but is not limited to, an associated computing device 200 and/or an associated provider object management device 302 goes offline and/or becomes unavailable. In these examples, the mapping table 314 may be updated to indicate another region associated with a mapping key. For example, in instances where the third region becomes unavailable, the mapping table 314 may be updated to:

TABLE II

| Mapping Keys | Associated Region Identifier |
|---|---|
| Mapping_Key1 | 310-1 |
| Mapping_Key2 | 310-1 |
| Mapping_Key3 | 310-2 |
| Mapping_Key4 | 310-2 |
| Mapping_Key5 | 310-2 |
| Mapping_Key6 | 310-2 |

In the mapping table 314 of Table II, Mapping_Key6 has been updated to be associated with the identifier 310-2 such that Mapping_Key6 is now associated with the second region (and not the third region). Such updating of the mapping table 314 may be performed via one or more of the computing devices 200 and/or one or more of the provider object management devices 302. For example, one or more of a computing device 200 and provider object management device 302 in one region may determine that another region has become unavailable and/or is becoming unavailable (e.g., by way of a message from a computing device 200 and/or a provider object management device 302 from the other region, and/or by way of communications with the computing device 200 and/or the provider object management device 302 from the other region ceasing, and the like). When such a determination occurs, the computing device 200 and/or the provider object management device 302 in the region where the determination is made may provide a command on the provider object stream 304 and/or via the API of the provider object management devices 302 to update the mapping table 314, and a computing device 200 and/or provider object management devices 302 that receives the command may update a respective the mapping table 314 accordingly. Alternatively, a computing device 200 and/or a provider object management devices 302 that is going offline may provide such a command.

Furthermore, such a command may be determined from a list (not depicted) of primary and secondary regions for the mapping keys, which may be stored separate from the mapping table 314. Hence, when a computing device 200 of a primary region goes offline, the mapping table 314 may be updated such that a mapping key is associated with a secondary region rather than a primary region. Put another way, a mapping key may be associated with a primary region and a secondary region. A primary region may comprise a region with which a mapping key is normally associated in the mapping table 314 unless the primary region becomes unavailable; similarly, a secondary region may comprise a region with which a mapping key is associated in the mapping table 314 when the primary region becomes unavailable. While present examples include a primary region and a secondary region, in other examples, mapping keys may be further associated with a tertiary region, such that when both a primary region and a secondary region become unavailable, a mapping key may be associated in the mapping table 314 with the tertiary region. Further examples may include quaternary regions, quinary regions, etc. such that as regions become successively unavailable, mapping key associations in the mapping table 314 may be updated accordingly.

In an example where a primary region of a mapping key has become unavailable, such that a mapping key association in the mapping table 314 is changed from an identifier 310 of the primary region to an identifier 310 of a secondary region, when the primary region later comes available, the mapping table 314 may be again updated so that an association of the mapping key changes back to the identifier 310 of the primary region.

Hence, in some examples, the mapping keys (e.g., one or more of the mapping keys and/or all of the mapping keys), may be associated with (e.g., at least) a primary region and a secondary region. In some of these examples, the mapping table 314 may indicate such regions, as shown in the following example:

TABLE III

| Mapping Keys | Associated Region Identifier |
|---|---|
| Mapping_Key1 | 310-1, 310-2 |
| Mapping_Key2 | 310-1, 310-2 |
| Mapping_Key3 | 310-2, 310-1 |

TABLE III-continued

| Mapping Keys | Associated Region Identifier |
| --- | --- |
| Mapping_Key4 | 310-2, 310-1 |
| Mapping_Key5 | 310-2, 310-1 |
| Mapping_Key6 | 310-3, 310-2 |

In the mapping table 314 of Table III, each mapping key is associated with two region identifiers 310, for example a primary region identifier 310 and a secondary region identifier 310, as indicated by an order of the region identifiers 310 in the mapping table 314. Hence, for example, Mapping_Key1 and Mapping_Key2 are associated with the first region as a primary region and the second region as the secondary region, for example as indicated by the order of identifiers 310-1, 310-2. Similarly, Mapping_Key3, Mapping_Key4 and Mapping_Key5 are associated with the second region as a primary region and the first region as the secondary region, for example as indicated by the order of identifiers 310-2, 310-1. Similarly, Mapping_Key6 is associated with the third region as a primary region and the second region as the secondary region, for example as indicated by the order of identifiers "310-3, 310-2".

In some examples, a secondary region with which a mapping key is associated may comprise a region that includes a provider object management device 302 that has at least the functionality of a respective provider object management device 302 of the primary region. For example, as the provider object management devices 302-1, 302-2 may both generate and update provider objects, and as the provider object management device 302-3 may update, but not generate, provider objects, the first region and the second region may be secondary regions for each other, but the third region may not be a secondary region of the first region and the second region. However, either the first region or the second region may be a secondary region for the third region.

In some examples, the identifiers 310 that identify the regions may comprise aliases of respective regions and hence, the mapping keys may be associated with respective aliases for the regions. As such, the mapping keys may be used in the indications 312 in place of the identifiers 310 so that the regions associated with provider objects may change using the mapping table 314, and without changing the mapping keys and/or the indications 312. Hence, the first indications 312-1 and the second indications 312-2 may include mapping keys associated with aliases of identifiers of respective provider object regions.

Furthermore, while the mapping keys have been described with respect to specific primary regions and secondary regions, in some examples, at least a secondary region associated with a mapping key may be changed dynamically in the system 300, for example by one or more of the provider object management devices 302 and/or any other suitable computing device of the system 300. For example, with reference to Table III, such a change in a secondary region associated with a mapping key may be changed by changing a secondary region identifier 310 associated with a mapping key in Table III. Such a change may occur when an associated computing device 200 and/or an associated provider object management device 302 of a secondary region goes offline and/or under any other suitable conditions (e.g., including, but not limited to, when an associated computing device 200 and/or an associated provider object management device 302 of a newly designated region goes online, and the like). However, such a dynamic change in a secondary region may occur in any suitable manner. Furthermore, such dynamic changes may occur for tertiary regions, quaternary regions, quinary regions, and the like.

Regardless of how an associated region of a mapping key of an indication 312 (and/or a log entry thereof) is provided and/or is changed, as will be described in more detail below, when an associated region of a mapping key of an indication 312 changes, behavior of a local persistence condition 212 may change and/or provider objects that had been associated with a primary region that has become unavailable may be at least temporarily replicated at the secondary region.

It is furthermore understood that, in some examples, provider objects associated with a primary region, for example stored at a memory 306 of the primary region, may be replicated to, and/or backed up at, a memory 306 of a secondary region. Hence, when a computing device 200 and/or a provider object management device 302 of the primary region becomes unavailable, and associated region of a mapping key changes from the primary region to the secondary region (e.g., by changing the associated identifier 310), the provider objects associated with the primary region that has become unavailable may be available from the secondary region (e.g., consistent with the associated identifier 310 of the mapping key).

Figure 4:
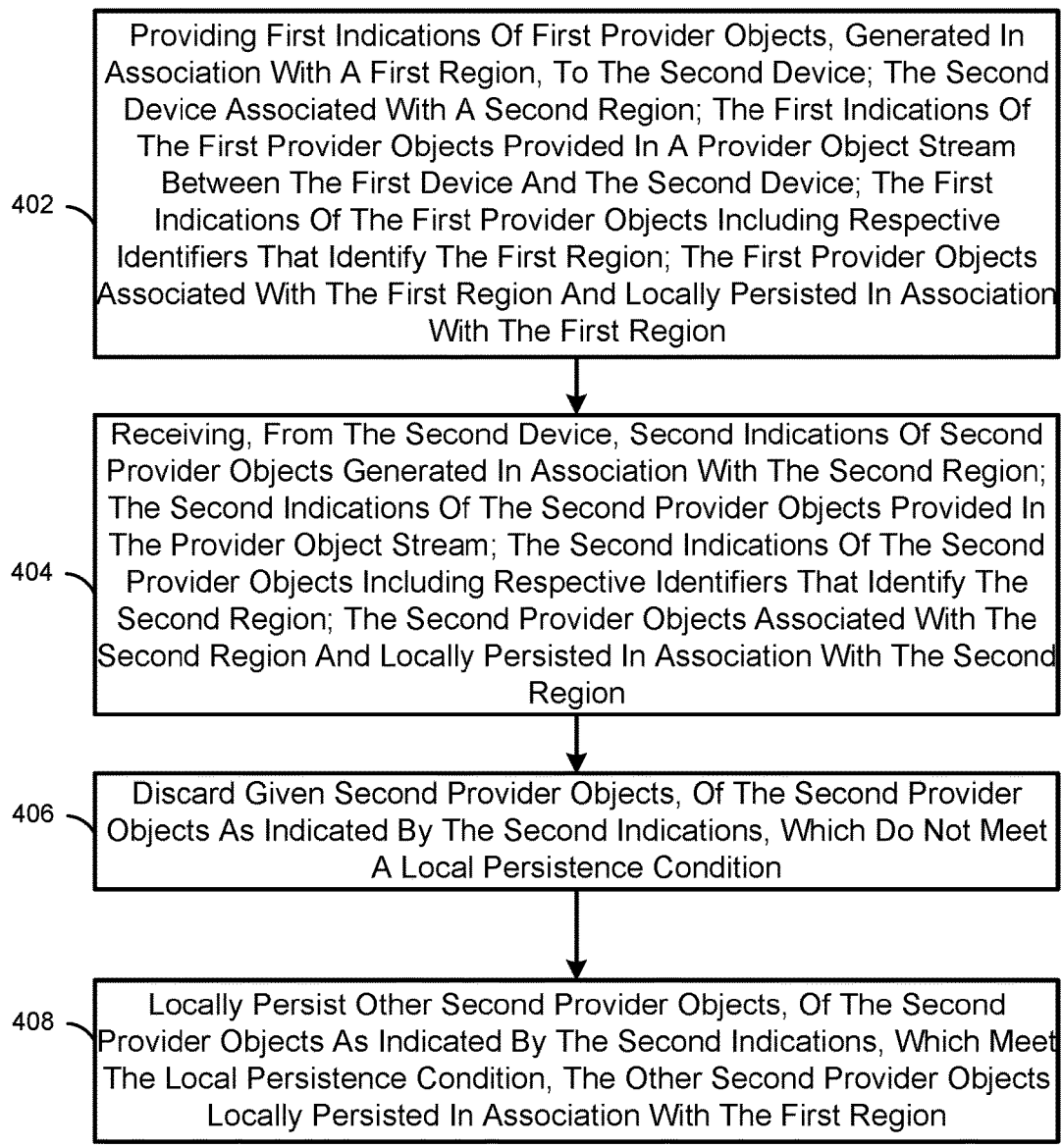
FIG. 4 depicts a flowchart of a method for distributing and locally persisting provider objects, according to non-limiting examples.

Attention is now directed to FIG. 4, which depicts a flowchart representative of a method 400 a method for distributing and locally persisting provider objects. The operations of the method 400 of FIG. 4 correspond to machine readable instructions that are executed by the computing devices 200, and specifically by controllers 202 of the computing devices 200. In the illustrated example, the instructions represented by the blocks of FIG. 4 are stored at the memory 204 (and/or one or more memories 204) for example, as the application 206. The method 400 of FIG. 4 is one way in which the controller(s) 202 and/or the computing device(s) 200 and/or the systems 100, 300 may be configured. Furthermore, the following discussion of the method 400 of FIG. 4 will lead to a further understanding of the systems 100, 300, and their various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 may be implemented on variations of the systems 100, 300, as well.

For illustrative purposes, the method 400 will be described with respect to being implemented by a controller 220 of the first computing device 200-1, though it is understood that the method 400, and/or variations thereof, may be implemented by each computing device 200 that provides and/or receives provider objects 308 via the provider object stream 304. In particular, the method 400 may be implemented at a computing device 200 for providing and receiving provider objects, the computing device 200 comprising a first device 200-1 of a plurality of devices 200 that includes at least a second device 200-2.

Furthermore, hereafter a computing device 200 will be interchangeably referred to as a device 200.

Furthermore, it is understood hereafter that the communication interface 208 of the first device 200-1 implementing the method 400 is generally configured to communicate with the second device 200-2.

It is furthermore understood that specific provider objects 308 may be identified between the devices 200, 302 via respective provider object identifiers (e.g., including, but not limited to, the aforementioned OfferIDs).

At a block 402, the controller 202, and/or the first device 200-1, provides (e.g., via the communication interface 208), the first indications 312-1 of the first provider objects 308-1, generated in association with the first region, to the second device 200-2. The second device 200-2 is understood to be associated with the second region. The first indications 312-1 of the first provider objects 308-1 are understood to be provided in the provider object stream 304 between the first device 200-1 and the second device 200-2. The first indications 312-1 of the first provider objects 308-1 are further understood to include (and/or be associated with) respective identifiers 310-1 (e.g., and/or the mapping keys) that identify the first region. The first provider objects 308-1 are further understood to be associated with the first region and locally persisted in association with the first region. Such local persistence is depicted with respect to FIG. 3 as the first provider objects 308-1 being stored at the memory 306-1 accessible to the first device 200-1.

At a block 404, the controller 202, and/or the first device 200-1, receives, (e.g., via the communication interface 208), from the second device 200-2, second indications 312-2 of second provider objects 308-2 generated in association with the second region. The second indications 312-2 of the second provider objects 308-2 are understood to be provided in the provider object stream 304. The second indications 312-2 of the second provider objects 308-2 are understood to include respective identifiers 310-2 (e.g., and/or the mapping keys) that identify the second region. The second provider objects 308-2 are understood to be associated with the second region and locally persisted in association with the second region. Such local persistence is depicted with respect to FIG. 3 as the second provider objects 308-2 being stored at the memory 306-2 accessible to the second device 200-2.

Details of providing and receiving the indications 312 of provider objects 308 are described in detail with respect to FIG. 3.

At a block 406, the controller 202, and/or the first device 200-1, discards given second provider objects 308-2 as indicated by the second indications 312-2, of the second provider objects 308-2 (e.g., received at the block 402), which do not meet the local persistence condition 212-1.

Such discarding may comprise ignoring any second provider objects 308-2 as indicated by the second indications 312-2 that do not meet the local persistence condition 212-1.

At a block 408, the controller 202, and/or the first device 200-1, locally persists other second provider objects 308-2, as indicated by the second indications 312-2, of the second provider objects 308-2 (e.g., received at the block 402), which meet the local persistence condition 212-1, the other second provider objects 308-2 locally persisted in association with the first region.

Such local persistence may comprise generating a replica of second provider objects 308-2, as indicated by the second indications 312-2, that meet the local persistence condition 212-1 and storing the replica in the memory 306-1. A replica of a second provider object 308-2 may generally comprise a copy of the second provider object 308-2, the replica including the identifier 310-2 of the second region, as well as the same provider object identifier of the second provider object 308-2. Hence, the first device 200-1 "knows" and/or may determine, that the replica of the second provider object 308-2 is associated with the second region and may replicate the second provider object 308-2 by communicating with the first provider object management device 302-1, which may retrieve a copy of the second provider object 308-2 from the second provider object management device 302-2 via the API, which is stored at the memory 306-1. As such, replicating of provider objects 308 as described herein may be understood to occur via provider object management devices 302 communicating with each other, for example via the API, for example to request a replica and/or a copy of a provider object 308. Furthermore, the existence of the replica of the second provider object 308-2 at the memory 306-1 further indicates to the first computing device 200-1 and the first provider object management device 302-1 that the parent second provider object 308-2 exists in the second region.

The local persistence condition 212-1 may, in some examples, comprises rules (e.g., programmatic rules) for discarding or locally persisting provider objects 308 as indicated (e.g., by the indications 312) in the provider object stream 304. However, the local persistence condition 212-1 may, in other examples, comprise a machine learning algorithm (e.g., machine learning classifiers) trained to discard or locally persist provider objects 308 as indicated (e.g., by the indications 312) in the provider object stream 304.

In some examples, rules and/or machine learning algorithm of the local persistence condition 212-1 may comprise criteria for identifying provider objects 308 that have been accessed or updated after an initial generation, and the local persistence condition 212-1 may indicate that provider objects 308 that have been identified as having been accessed or updated after an initial generation are locally persisted (e.g., stored at the memory 306-1).

Hence, in some examples, only provider objects 308 that are indicated by the indications 312 as having been updated (e.g., at the selecting step and/or the booking step and/or the paying step of the computing-process flow 110) may be locally persisted in region with which the provider objects 308 are not associated.

Put another way, the first device 200-1 may discard second provider objects 308-2 that are indicated as having been newly generated in, and/or newly associated with, the second region (e.g., by the second provider object management device 302-2) and locally persist provider objects 308-2 (e.g., associated with the second region) that are indicated as updated (e.g., by the second provider object management device 302-2 or another provider object management device 302).

While such examples are specific to the local persistence condition 212-1 of the first region, local persistence conditions 212 are understood to have similar configurations, though local persistence conditions 212 may be different for different regions.

Furthermore, associations between provider objects 308 and regions may be indicated by mapping keys of the indications 312 such that, when an association of a mapping key in the mapping table 314 changes from a primary region to a secondary region, a local persistence condition 212 may cause a provider object 308 that was initially associated with a primary region as indicated by a mapping key of an indication 312 to be treated differently after a region association of the mapping key changes to a secondary region according to the mapping table 314.

For example, with reference to a provider object 308 identified in an indication 213 using Mapping_Key5 (e.g., see Table I, Table II and Table III) initially associated with the identifier 310-2, such that the provider object 308 is initially associated with the second region as a primary region, the local persistence condition 212-3 may cause the third device 200-3 to discard provider objects 308 that are indicated as having been newly generated in association with the second region.

However, when the second region becomes unavailable, an association for the Mapping_Key5 may change in the mapping table 314 to the identifier 310-1 such that the same provider object 308 is now associated with the first region as a secondary region (e.g., and a copy of the provider object 308 may be stored at the memory 306-1). However, the local persistence condition 212-3 may or may not indicate that the third device 200-3 is to persist such a provider object 308.

Regardless, it is understood that any suitable provider objects 308 indicated in the provider object stream 304 may be locally persisted according to a local persistence condition 212, though such provider objects 308 may be considered "high value" provider objects 308 and/or have a high probability of being booked and paid for, which may be indicated by the indications 312.

While the term "high value" is a relative term, determination of "high value" provider objects may be determined programmatically, and the like. For example, a probability of a provider object 308 being booked and paid for may be determined (e.g., by a computing device 200 and/or a provider object management device 302 in the region associated with the provider object 308) and provided in a respective indication 312 in the provider object stream 304. Such a probability may be based on comparing the provider object 308 with percentages of similar provider objects 308 that were booked and paid. In these examples, a local persistence condition 212, of a computing device 200 receiving the respective indication 312, may comprise a threshold probability (e.g., such as 10%, 40%, 50%, 90%, 95%, among other possibilities) and when the probability of the provider object 308 is above the threshold probability, the provider object 308 may be locally persisted and otherwise discarded. However, in other examples, the receiving computing device 200 (e.g., a computing device 200 receiving an indication 312) may generate a probability of a provider object 308, indicated in the provider object stream 304, of being booked and paid for. Alternatively similar and/or corresponding functionality may be performed by any suitable combination of machine learning algorithms trained to "recognize" high value provider objects 308.

It is hence generally understood that the method 400 may be adapted to function with more than two devices 200. Furthermore, it is understood hereafter that the communication interface 208 of the first device 200-1 implementing the method 400 is generally configured to communicate with additional devices 200 of the plurality of devices 200.

In particular, the method 400 may be adapted such that the provider object stream 304 is between all of the plurality of devices 200, and such that the method 400 further comprises, the controller 202 and/or the first device 200-1:

providing the first indications 312-1 of the first provider objects 308-1 to all the additional devices 200 of the plurality of devices 200 in the provider object stream 304;

receiving (e.g., via the communication interface 208) from one or more of the additional devices 200, additional indications 312 of additional provider objects 308 generated in association with respective additional regions associated with one or more of the additional devices 200; the additional indications 312 of the additional provider objects provided in the provider object stream 304; the additional indications 312 of the additional provider objects 308 including the respective identifiers 310 that identify respective additional regions; the additional provider objects 308 associated with the respective additional regions and locally persisted in association with the respective additional regions;

discarding given additional provider objects 308, of the additional provider objects 308 indicated by the additional indications 312, which do not meet the local persistence condition 212-1; and locally persisting other additional given provider objects 308, of the additional provider objects 308 indicated by the additional indications 312, which meet the local persistence condition 212-1, the additional provider objects 308 locally persisted in association with the first region.

Other features of the method 400 are within the scope of the present specification.

For example, it is understood that while provider objects 308 associated with a given region may be identified using the described identifiers 310, the first provider objects 308-1 may be associated via any suitable first common identifier (e.g., a mapping key), and the second provider objects 308-2 may be associated via any suitable second common identifier (e.g., another mapping key).

It is further understood that a provider object 308 associated with a first region, and one or more replicas of the provider object 308 stored in other regions, have a common identifier, such as a common OfferID, and the like.

Furthermore, the method 400 may further comprise, the controller 202 and/or the first device 200-1: determining, for a given first provider object 308-1, that an updated version of the given first provider object 308-1 has been locally persisted in association with the first region; and providing, in the provider object stream 304, an update indication 312 of the updated version of the given first provider object 308-1.

For example, the given first provider object 308-1 may have been updated by the first provider object management device 302-1 (and/or another via another provider object management device 302, as described in more detail below), and the controller 202 and/or the first device 200-1 provides an indication thereof in the provider object stream 304, for example as another log, and/or versioned log, of the first provider objects 308-1 (e.g., as updated) stored at the memory 306-1.

Updating of a first provider object 308-1 via another provider object management device 302 is next described with respect to an example where functionality of the first provider object management device 302-1 is combined with the first device 200-1 and/or via the first device 200-1 communicating with the first provider object management device 302-1. In particular, the method 400 may further comprise, the controller 202 and/or the first device 200-1 (and/or the first provider object management device 302-1): receiving a request to update a given first provider object 308-1; generate, for the given first provider object 308-1, an updated version of the given first provider object 308-1; locally persisting the given first provider object in association with the first region; and providing, in the provider object stream 304, an update indication 312 of the updated version of the given first provider object 308-1.

For example, the request to update the given first provider object 308-1 may be received from another provider object management device 302 that has previously locally persisted a replica of the given first provider object 308-1; in some of these examples, the other provider object management device 302 may not be enabled to perform such updates and hence provides, to the first device 200-1, the request to update the given first provider object 308-1 via the API. The request may generally indicate to the first device 200-1, and/or the first provider object management device 302-1, information for updating the given first provider object 308-1, and the first device 200-1, and/or the first provider object management device 302-1, may update the given first provider object 308-1 accordingly (e.g., to add or change associated items, change a price thereof, and/or make any other suitable changes). The first device 200-1, and/or the first provider object management device 302-1, having updated the given first provider object 308-1, provides an update indication 312 in the provider object stream 304. Such an update indication 312 is similar to the previously described indications 312, but indicates the updated given first provider object 308-1. Other computing devices 200 receiving the update indication 312 may generally locally persist a replica of the updated given first provider object 308-1, presuming the updated given first provider object 308-1 meets a local persistence condition 212.

Alternatively, the other provider object management device 302 that has previously locally persisted a replica of the given first provider object 308-1 may perform the update and provide, via an associated computing device 200, an update indication 312 of the updated given first provider object 308-1 in the provider object stream 304, such that other computing devices 200, including the first device 200-1, receiving the update indication 312 may generally locally persist (e.g., an associated provider object management device 302 and the API) a replica of the updated given first provider object 308-1, presuming the updated given first provider object 308-1 meets a local persistence condition 212.

In particular, when the given first provider object 308-1, and/or a replica thereof, is locally persisted at a computing device 200 receiving the update indication 312, the computing device 200 and/or an associated provider object management device 302, may replace the given first provider object 308-1, and/or the replica thereof, with a replica of the updated given first provider object 308-1.

Put another way, when a provider object 308, and/or a replica thereof, is updated at a memory 306, the previous version of the provider object 308, and/or the replica thereof, is replaced with the updated provider object 308 and/or the updated replica thereof, such that, at a memory 306, there is only one provider object and/or replica that is identified by a given provider object identifier. Put yet another way, earlier versions of such provider objects 308 with the same given provider object identifier are deleted from a memory 306.

In some examples, updates of provider objects 308 associated with a given region may be only performed by a computing device 200, and/or an associated provider object management device 302, that is also associated with the given region In particular, in some examples, only the first device 200-1 (and/or the first provider object management device 302-1) may update provider objects 308 identified by the first identifier 310-1.

Similarly, the first device 200-1 (and/or the first provider object management device 302-1) may receive a request to update a provider object 308 associated with the region different from the first region. The first device 200-1 (and/or the first provider object management device 302-1) may, or may not, have previously stored a replica thereof. In these examples, the first device 200-1 (and/or the first provider object management device 302-1) may forward the request to the device 200 (and/or the provider object management device 302) of the region associated with the provider object 308 that is being updated.

In a particular example, where the third device 200-1 (and/or the third provider object management device 302-3) generates and provides a request to update a second provider object 308-2 to the first device 200-1 (and/or the first provider object management device 302-1), the method 400 may further comprise, the controller 202 and/or the first device 200-1 (and/or the first provider object management device 302-1): receiving, from the third device 200-3 (and/or the third provider object management device 302-3) associated with the third region, a request to update a given second provider object 308-2 associated with the second region; and sending (e.g., forwarding) the request to the second device 200-2 such that the second device 200-2 generates an updated version of the given second provider object 308-2 (e.g., and provides an update indication thereof in the provider object stream 304). Such an exchange may occur via the APIs.

In some examples, provider objects 308 may be exchanged between the devices 200. For example, the method 400 may further comprise, the controller 202 and/or the first device 200-1 (and/or the first provider object management device 302-1): receiving, from the second device 200-2 (and/or the second provider object management device 302-2), a request for a given first provider object 308-1; and providing, to the second device 200-2 (and/or the second provider object management device 302-2), the given first provider object 308-1 to the second device 200-2. Such an exchange may occur via the APIs and may occur when the second device 200-2 receives, from a client device 104 associated with the second region, a request for a provider object 308, the request including the provider object identifier of the provider object 308 and the first identifier 310-2. For example, the client device 104 associated with the second region, that initiates, the request may have received information identifying the provider object 308 from another client device 104 associated with the first region (e.g., such client devices 104 may be operated by a common entity, which enables the client devices 104 to communicate and/or exchange information about provider objects 308). Such an exchange may also occur when a secondary region association of a mapping key changes at the mapping table 314 (e.g., such that provider objects associated with an updated secondary region are replicated at a primary region associated with the mapping key at the mapping table 314, as described above).

Figure 5:
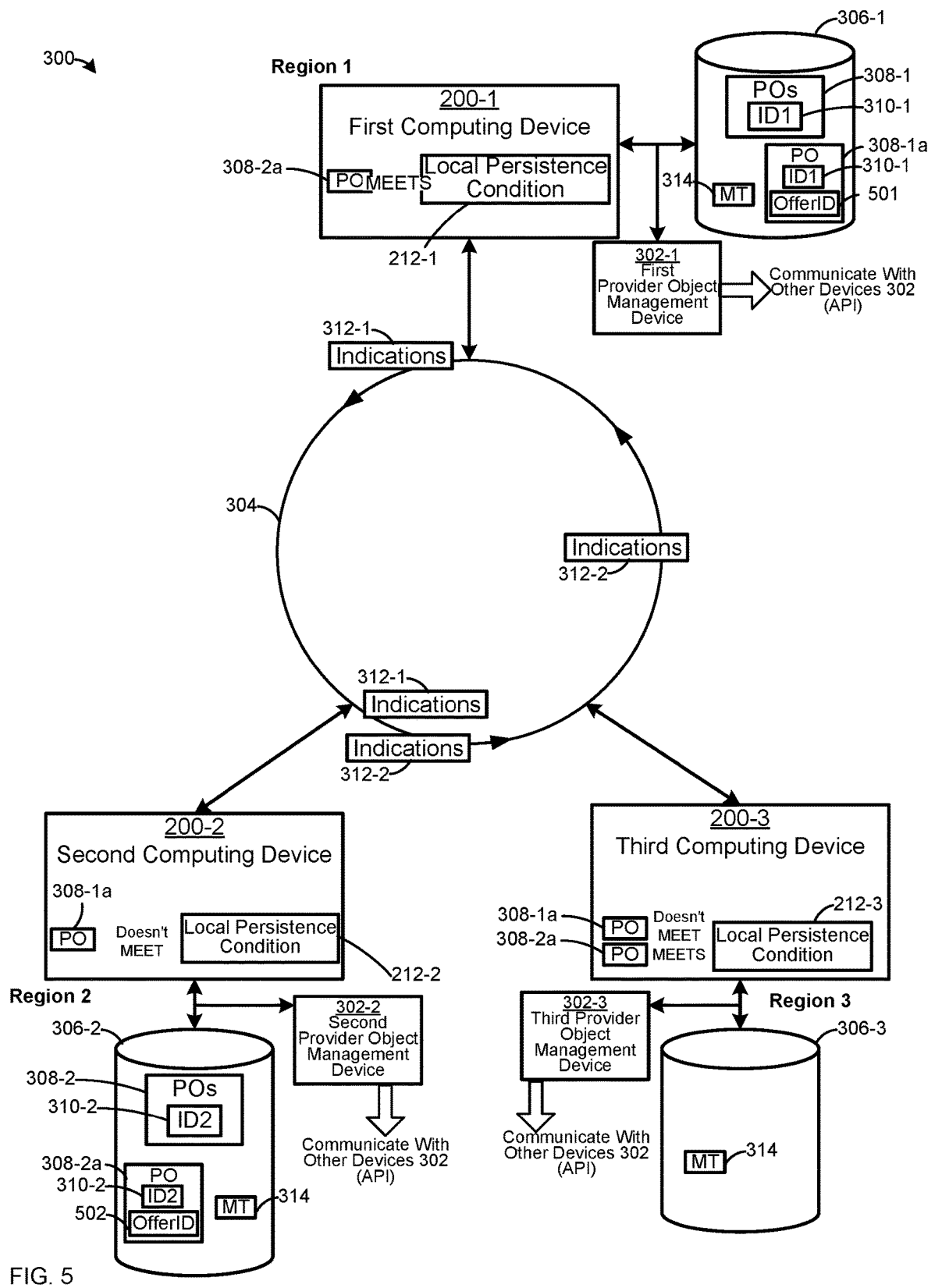
FIG. 5 depicts devices of the system of FIG. 3 implementing aspects of a method for distributing and locally persisting provider objects, according to non-limiting examples.
Figure 6:
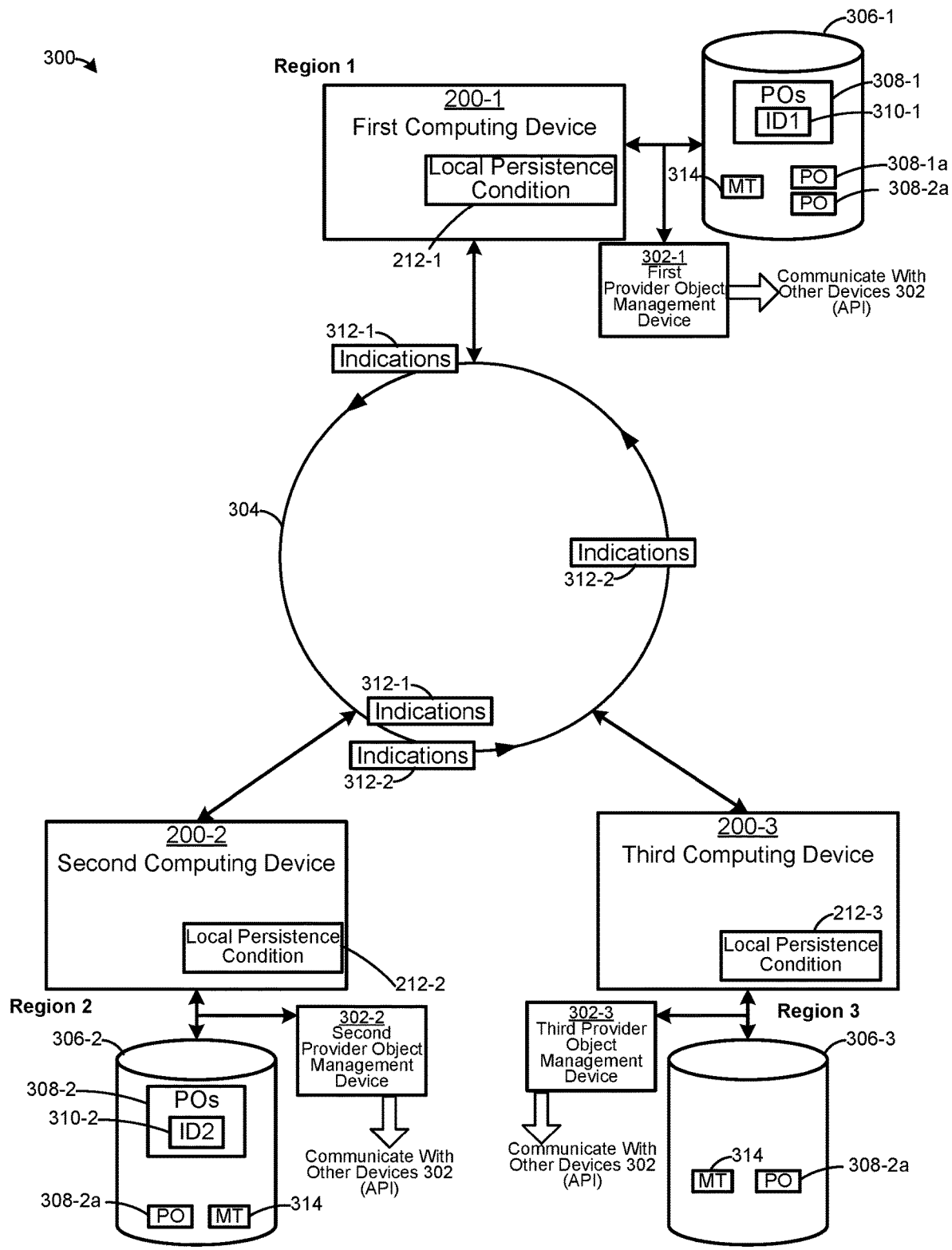
FIG. 6 depicts devices of the system of FIG. 3 implementing further aspects of the method for distributing and locally persisting provider objects, according to non-limiting examples.

An example of the method 400 is next described with respect to FIG. 5 and FIG. 6, which are substantially similar to FIG. 3, with like components having like numbers. In FIG. 5 and FIG. 6 it is understood that all of the depicted devices 200 are implementing the method 400. In FIG. 5 and FIG. 6, the mapping table 314 is labelled by "MT" for simplicity.

As depicted, in FIG. 5, the first device 200-1 is providing (e.g., at the block 402 of the method 400) the first indications 312-1 on the provider object stream 304 and receiving (e.g., at the block 404 of the method 400) the second indications 312-2 on the provider object stream 304.

Similarly, the second device 200-2 is providing (e.g., at the block 402 of the method 400) the second indications 312-2 on the provider object stream 304 and receiving (e.g., at the block 404 of the method 400) the first indications 312-1 on the provider object stream 304.

Similarly, the third device 200-3 is receiving (e.g., at the block 404 of the method 400) the first indications 312-1 and the second indications 312-2 on the provider object stream 304. No indications from the third device 200-3 are provided as no provider objects 308 are associated with the third region.

It is understood that the first indications 312-1 include an indication of a first provider object 308-1a associated with the first region, as stored in the memory 306-1, and that the first provider object 308-1a comprises the identifier 310-1 (and/or any other suitable identifier common to the first provider object 308) and an identifier 501 of the first provider object 308-1a. The first provider object 308-1a is stored at the memory 306-1. It is understood that entries of a log of the first indications 312-1 may have a format according to Equation (1) such that the indication of the first provider object 308-1a in the first indications 312-1 may include: the identifier 501 of the first provider object 308-1a (e.g., as the "Identifier (PO)"); a mapping key such as Mapping_Key1 (e.g., in place of the identifier 310-1 and/or as an alias of the identifier 310-1); and a "Lifecycle (PO)" of the first provider object 308-1a (e.g., such as a time at which the first provider object 308-1a expires). The first indications 312-2 may also indicate whether the first provider object 308-1a is newly generated or has been updated, and/or may indicate a step of the computing-process flow 110 at which the first provider object 308-1a has been updated, and the like.

It is understood that the second indications 312-2 include an indication of a second provider object 308-2a associated with the second region, as stored in the memory 306-2, and that the second provider object 308-2a comprises the identifier 310-2 (and/or any other suitable identifier common to the second provider object 308) and an identifier 502 of the second provider object 308-2a. The second provider object 308-2a is stored at the memory 306-2. It is understood that entries of a log of the second indications 312-2 may have format according to Equation (1) such that the indication of the second provider object 308-2a in the second indications 312-2 may include: the identifier 501 of the second provider object 308-2a (e.g., as the "Identifier (PO)"); a mapping key such as Mapping_Key1 (e.g., in place of the identifier 310-2 and/or as an alias of the identifier 310-2); and a "Lifecycle (PO)" of the second provider object 308-2a (e.g., such as a time at which the second provider object 308-2a expires). The second indications 312-2 may also indicate whether the second provider object 308-2a is newly generated or has been updated, and/or may indicate a step of the computing-process flow 110 at which the second provider object 308-2a has been updated, and the like.

As also depicted in FIG. 5, the first computing device 200-1 determines whether the second provider object 308-2a, indicated by the second indications 312-2, meets the local persistence condition 212-1. For example, the second provider object 308-2a may comprise an updated provider object 308 as described herein. As depicted, the first computing device 200-1 determines (e.g., at the block 408 of the method 400) that the second provider object 308-2a meets the local persistence condition 212-1. As such, the second provider object 308-2a is replicated and stored at the memory 306-1 (e.g., as depicted in FIG. 6). In general the determination may be performed using information in the second indications 312-2 and the second provider object 308-2a isn't replicated unless the second provider object 308-2a meets the local persistence condition 212-1 (e.g., to prevent replication of all provider objects 308-2).

In contrast, the second computing device 200-2 determines whether the first provider object 308-1a, indicated by the first indications 312-1, meets the local persistence condition 212-2. For example, the first provider object 308-1a may comprise a newly generated provider object 308 (e.g., generated at a requesting and/or shopping step of the computing-process flow 110, and hence the first provider object 308-1a has not been updated) as described herein. As depicted, the second computing device 200-2 determines (e.g., at the block 406 of the method 400) that the first provider object 308-1a does not meet the local persistence condition 212-2 and hence no replica of the first provider object 308-1a is generated and/or the first provider object 308-1a is discarded. Put another way, the determination may be performed using information in the first indications 312-1 and the first provider object 308-1a isn't replicated unless the first provider object 308-1a meets the local persistence condition 212-2 (e.g., to prevent replication of all provider objects 308-2).

Similarly, the third computing device 200-3 determines (e.g., at the block 406 of the method 400) that the first provider object 308-1a does not meet the local persistence condition 212-3 and further determines (e.g., at the block 408 of the method 400) that the second provider object 308-2a does meet the local persistence condition 212-3. As such, the second provider object 308-2a is replicated and stored at the memory 306-3 (e.g., as depicted in FIG. 6).

Attention is next directed to FIG. 6, which depicts the system 300 after implementation of the method 400. In particular, the memory 306-1 associated with the first region stores the first provider object 308-1a and a replica of the second provider object 308-2a, the memory 306-2 associated with the second region stores the second provider object 308-2a, and the memory 306-3 associated with the third region stores a replica of the second provider object 308-2a. Updates to the provider objects 308 stored at the memories 306 may then occur according to any suitable process, as described herein (though any suitable update process may be implemented).

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A device for providing and receiving provider objects, the device comprising a first device of a plurality of devices that includes at least a second device, the device comprising:
    a communication interface configured to communicate with the second device;
    a controller configured to:
        automatically transmit, via the communication interface, first indications of first provider objects, generated in association with a first region, to the second device; the second device associated with a second region; the first indications of the first provider objects provided in a provider object stream between the first device and the second device; the first indications of the first provider objects including respective identifiers that identify the first region; the first provider objects associated with the first region and locally persisted in association with the first region;
        receive, via the communication interface, from the second device, second indications of second provider objects generated in association with the second region; the second indications of the second provider objects provided in the provider object stream; the second indications of the second provider objects including respective identifiers that identify the second region; the second provider objects associated with the second region and locally persisted in association with the second region;
        discard given second provider objects, of the second provider objects as indicated by the second indications, which do not meet a local persistence condition; and
        locally persist other second provider objects, of the second provider objects as indicated by the second indications, which meet the local persistence condition, the other second provider objects locally persisted in association with the first region, wherein locally persisting comprises:
            retrieving a copy of the other second provider objects from the second device and storing the copy of the other second provider objects in a memory of the first device.

2. The device of claim 1, wherein the communication interface is further configured to communicate with additional devices of the plurality of devices,
    wherein the provider object stream is between all of the plurality of devices, and
    wherein the controller is further configured to:
        provide, via the communication interface, the first indications of the first provider objects to all the additional devices of the plurality of devices in the provider object stream;
        receive, via the communication interface, from one or more of the additional devices, additional indications of additional provider objects generated in association with respective additional regions associated with one or more of the additional devices; the additional indications of the additional provider objects provided in the provider object stream; the additional indications of the additional provider objects including the respective identifiers that identify respective additional regions; the additional provider objects associated with the respective additional regions and locally persisted in association with the respective additional regions;
        discard given additional provider objects, of the additional provider objects indicated by the additional indications, which do not meet the local persistence condition; and
        locally persist other additional given provider objects, of the additional provider objects indicated by the additional indications, which meet the local persistence condition, the additional provider objects locally persisted in association with the first region.

3. The device of claim 1, wherein the controller is further configured to:
    determine, for a given first provider object, that an updated version of the given first provider object has been locally persisted in association with the first region; and
    provide, in the provider object stream, an update indication of the updated version of the given first provider object.

4. The device of claim 1, wherein the controller is further configured to: receive a request to update a given first provider object;
    generate, for the given first provider object, an updated version of the given first provider object;
    locally persist the given first provider object in association with the first region; and
        provide, in the provider object stream, an update indication of the updated version of the given first provider object.

5. The device of claim 1, wherein the controller is further configured to:
receive, from a third device associated with a third region, a request to update a given second provider object associated with the second region; and
send the request to the second device such that the second device generates an updated version of the given second provider object.

6. The device of claim 1, wherein the controller is further configured to:
receive, from the second device, a request for a given first provider object; and
provide, to the second device, the given first provider object to the second device.

7. The device of claim 1, wherein the local persistence condition comprises rules for discarding or locally persisting the provider objects as indicated in the provider object stream.

8. The device of claim 1, wherein the local persistence condition comprises rules for discarding or locally persisting the provider objects received in the provider object stream,
wherein the rules comprise criteria for identifying the provider objects that have been accessed or updated after an initial generation, and
wherein the provider objects that have been identified as having been accessed or updated after an initial generation are locally persisted.

9. The device of claim 1, wherein the first provider objects are associated via a first common identifier, and the second provider objects are associated via a second common identifier.

10. The device of claim 1, wherein the first indications and the second indications include mapping keys associated with aliases of identifiers of respective provider object regions.

11. A method for providing and receiving provider objects at a first device of a plurality of devices that includes at least a second device, the method comprising:
automatically transmitting, from the first device, first indications of first provider objects, generated in association with a first region, to the second device;
the second device associated with a second region; the first indications of the first provider objects provided in a provider object stream between the first device and the second device; the first indications of the first provider objects including respective identifiers that identify the first region; the first provider objects associated with the first region and locally persisted in association with the first region;
receiving, at the first device, from the second device, second indications of second provider objects generated in association with the second region; the second indications of the second provider objects provided in the provider object stream; the second indications of the second provider objects including respective identifiers that identify the second region; the second provider objects associated with the second region and locally persisted in association with the second region;
discarding, via the first device, given second provider objects, of the second provider objects as indicated by the second indications, which do not meet a local persistence condition; and
locally persisting, via the first device, other second provider objects, of the second provider objects as indicated by the second indications, which meet the local persistence condition, the other second provider objects locally persisted in association with the first region, wherein locally persisting comprises:
retrieving a copy of the other second provider objects from the second device and storing the copy of the other second provider objects in a memory of the first device.

12. The method of claim 11, wherein the first device is further configured to communicate with additional devices of the plurality of devices,
wherein the provider object stream is between all of the plurality of devices, and
wherein the method further comprises:
providing, from the first device, the first indications of the first provider objects to all the additional devices of the plurality of devices in the provider object stream;
receiving, at the first device, from one or more of the additional devices, additional indications of additional provider objects generated in association with respective additional regions associated with one or more of the additional devices; the additional indications of the additional provider objects provided in the provider object stream; the additional indications of the additional provider objects including the respective identifiers that identify respective additional regions; the additional provider objects associated with the respective additional regions and locally persisted in association with the respective additional regions;
discarding given additional provider objects, of the additional provider objects indicated by the additional indications, which do not meet the local persistence condition; and
locally persisting other additional given provider objects, of the additional provider objects indicated by the additional indications, which meet the local persistence condition, the additional provider objects locally persisted in association with the first region.

13. The method of claim 11, further comprising:
determining, for a given first provider object, that an updated version of the given first provider object has been locally persisted in association with the first region; and
providing, in the provider object stream, an update indication of the updated version of the given first provider object.

14. The method of claim 11, further comprising:
receiving a request to update a given first provider object;
generating, for the given first provider object, an updated version of the given first provider object;
locally persisting the given first provider object in association with the first region; and
providing, in the provider object stream, an update indication of the updated version of the given first provider object.

15. The method of claim 11, further comprising:
receiving, at the first device, from a third device associated with a third region, a request to update a given second provider object associated with the second region; and
sending, from the first device, the request to the second device such that the second device generates an updated version of the given second provider object.

16. The method of claim 11, further comprising:
receiving, from the second device, a request for a given first provider object; and providing, to the second device, the given first provider object to the second device.

17. The method of claim 11, wherein the local persistence condition comprises rules for discarding or locally persisting the provider objects as indicated in the provider object stream.

18. The method of claim 11, wherein the local persistence condition comprises rules for discarding or locally persisting the provider objects received in the provider object stream,
   wherein the rules comprise criteria for identifying the provider objects that have been accessed or updated after an initial generation, and
   wherein the provider objects that have been identified as having been accessed or updated after an initial generation are locally persisted.

19. The method of claim 11, wherein the first provider objects are associated via a first common identifier, and the second provider objects are associated via a second common identifier.

20. The method of claim 11, wherein the first indications and the second indications include mapping keys associated with aliases of identifiers of respective provider object regions.

* * * * *